United States Patent [19]
Smazik
[11] Patent Number: 4,889,148
[45] Date of Patent: Dec. 26, 1989

[54] FLOW CONTROL VALVE FOR A DISPENSING SYSTEM

[75] Inventor: Kenneth G. Smazik, Marietta, Ga.

[73] Assignee: The Coca-Cola Company, Atlanta, Ga.

[21] Appl. No.: 239,566

[22] Filed: Sep. 1, 1988

Related U.S. Application Data

[63] Continuation-in-part of Ser. No. 164,364, Mar. 4, 1988, which is a continuation-in-part of Ser. No. 137,307, Dec. 23, 1987, which is a continuation-in-part of Ser. No. 924,381, Oct. 29, 1986, abandoned.

[51] Int. Cl.⁴ .......... F16K 31/06
[52] U.S. Cl. .......... 137/1; 251/129.07; 251/129.08; 251/282
[58] Field of Search .......... 251/28 L, 129.08, 129.07

[56] References Cited

U.S. PATENT DOCUMENTS

| | | | |
|---|---|---|---|
| 4,493,474 | 1/1985 | Ohyama | 251/282 X |
| 4,582,294 | 4/1986 | Fargo | 251/282 X |
| 4,643,394 | 2/1987 | Shimura et al. | 251/129.08 |
| 4,662,604 | 5/1987 | Cook | 251/282 X |

*Primary Examiner*—Arnold Rosenthal
*Attorney, Agent, or Firm*—Thomas R. Boston; W. Dexter Brooks

[57] ABSTRACT

A liquid flow control solenoid valve for a beverage dispensing system wherein a rolling diaphragm seal is used between a needle valve and the valve body and the increased hydraulic forces on the needle valve caused by the rolling diaphragm are balanced by using a needle valve that is tapered in a direction to create a force on the needle valve in the direction opposite to the force created by the rolling diaphragm, so that the hydraulic forces are balanced and a smaller solenoid can be used to operate the valve.

8 Claims, 17 Drawing Sheets

FLOW CONTROL VALVE FOR A DISPENSING SYSTEM

CROSS-REFERENCE TO RELATED APPLICATION

This application is a continuation in part of co-pending U.S. patent application Ser. No. 07/164,364, filed Mar. 4, 1988, entitled "Postmix Juice Dispensing System," and having the same inventors and assignee as the present application; which was in turn a continuation-in-part of co-pending U.S. patent application Ser. No. 07/137,307, filed Dec. 23, 1987, entitled "Postmix Juice Dispensing System," and having the same inventors and assignee as the present application; which was in turn a continuation-in-part of abandoned U.S. patent application Ser. No. 06/924,381, filed Oct. 29, 1986, entitled "Post-mix Juice Dispensing System," and having the same inventors and assignee as the present application.

BACKGROUND OF THE INVENTION

1. Field of the Invention

This invention relates to beverage dispensing and in a preferred embodiment to a flow control valve therefor.

2. Description of the Prior Art

Postmix orange juice dispensing systems are known. Orange juice concentrate is distributed frozen. Restaurants remove concentrate from the freezer and thaw the concentrate in a cooler prior to dispensing. The restaurant has to estimate its juice requirements at least two days in advance and place sufficient concentrate in its cooler. If the restaurant's estimates are incorrect or if someone forgets, the restaurant will run out of thawed concentrate. Also, there is often a limited amount of cooler space available for thawing orange juice concentrate. When a restaurant runs out of thawed concentrate, measures are sometimes taken to quickly thaw frozen concentrate and such measures often are inefficient and ineffective and also sometimes affect the taste of the resulting product. Orange juice concentrate has typically been 3+1 concentrate. The present invention is useful preferably with 5+1 concentrate, although it can be used with any desired ratio up to about 7.5+1. The reduced amount of water in 5+1 concentrate prevents a phase change or freezing, at typical freezer temperatures of −10° F. to 0° F. The 5+1 concentrate at freezer temperatures does not readily flow by gravity. A container of 0° F. product can be inverted and no product will flow out. Also, the product is so thick that a pump's suction cannot pull product from the container. However, the product is still pliable.

It is an object of the present invention to provide a flow control valve for a beverage dispensing system.

SUMMARY OF THE INVENTION

In the preferred embodiment, a water flow control valve is described for a postmix juice dispensing system for dispensing concentrate (preferably 5+1 concentrate) at freezer temperatures from a flexible bag. The water flow control valve employs a rolling diaphragm to isolate the water from the solenoid, and a tapered needle valve tapering from a smaller to a larger diameter to balance the hydraulic forces. The rolling diaphragm in combination with the tapered needle valve provide a smaller force to be overcome by the solenoid so that a smaller, less expensive, less powerful solenoid can be used.

The method of the overall juice dispensing system includes placing the bag in a rigid, pressurizable container, pressurizing the container to force concentrate out of the bag, feeding concentrate through a heat exchanger to raise the temperature to about 32° to 40° F., feeding the thawed concentrate to a metering device along with water for controlling the mixture ratio, and then feeding the water and concentrate to a mixing chamber of a dispensing valve for dispensing the mixture as an orange juice beverage into a cup. The concentrate bag preferably incorporates a dip tube or dip strip with slots larger than the pulp in the concentrate and with an internal cross-sectional area much greater than that of the slots to facilitate flowing of the concentrate and to reduce pressure drops. The tube prevents the bag from blocking the internal passageway therethrough. Concentrate emerging from the bag can be as cold as −10° F. The heat exchanger can use recirculating soda water and a heating element to prevent the water from freezing. The proper portioning of water and orange juice concentrate during reconstitution can incorporate a volumetric piston pump operated by the pressurized water. Alternatively, the water and orange juice concentrate can be metered by use of a flow meter to measure the water flow rate and a volumetric pump with motor drive at a fixed speed to meter the concentrate. Control electronics, such as a microcontroller can regulate the water flow rate by use of a motorized control valve. The concentrate pump's motor can be adjustable and the control electronics can then also or alternatively regulate the speed of the pump motor depending on the water flow rate. The actual reconstituting of the metered water and concentrate can incorporate either a static or a dynamic mixer, or both.

In a preferred embodiment, the dispenser includes the linear modulating solenoid valve of this invention for the water and a gerotor pump for the concentrate. At the pump outlet is a poppet valve to prevent concentrate from dripping out of the pump and also a check valve to prevent flushing water from going up through the pump into the concentrate reservoir and diluting the concentrate. The system includes separate flushing and sanitizing operations. The system includes under-the-counter modules that can include a canister cabinet, a water bath and a refrigeration unit.

The under-the-counter system includes a recirculating water chiller for chilling the concentrate in the dispenser reservoir. The canister cabinet supports the pressurizable concentrate canister in a water bath to maintain the concentrate below 40° F. The concentrate flows out of the concentrate bag through a heat exchange coil also located in the water bath to heat up the concentrate so it will flow more easily. The potable water line includes a heat exchange coil in a cold water bath to chill the potable water to be used in the dispenser.

BRIEF DESCRIPTION OF THE DRAWINGS

The present invention will be more fully understood from the detailed description below when read in connection with the accompanying drawings wherein like reference numerals refer to like elements, and wherein.

DETAILED DESCRIPTION OF THE PREFERRED EMBODIMENTS

Figure 1:
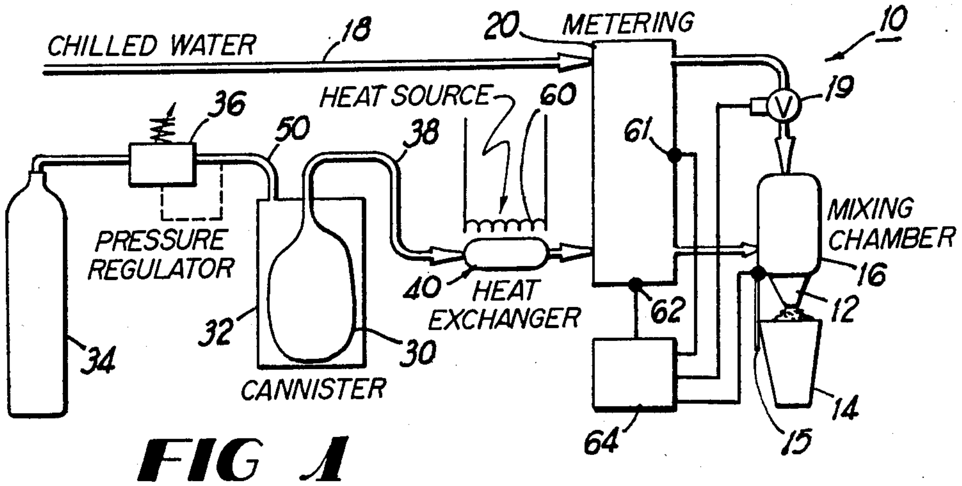
FIG. 1 is a partly diagrammatic, partly schematic illustration of a postmix juice dispensing system according to the present invention.
Figures 8A, 9:
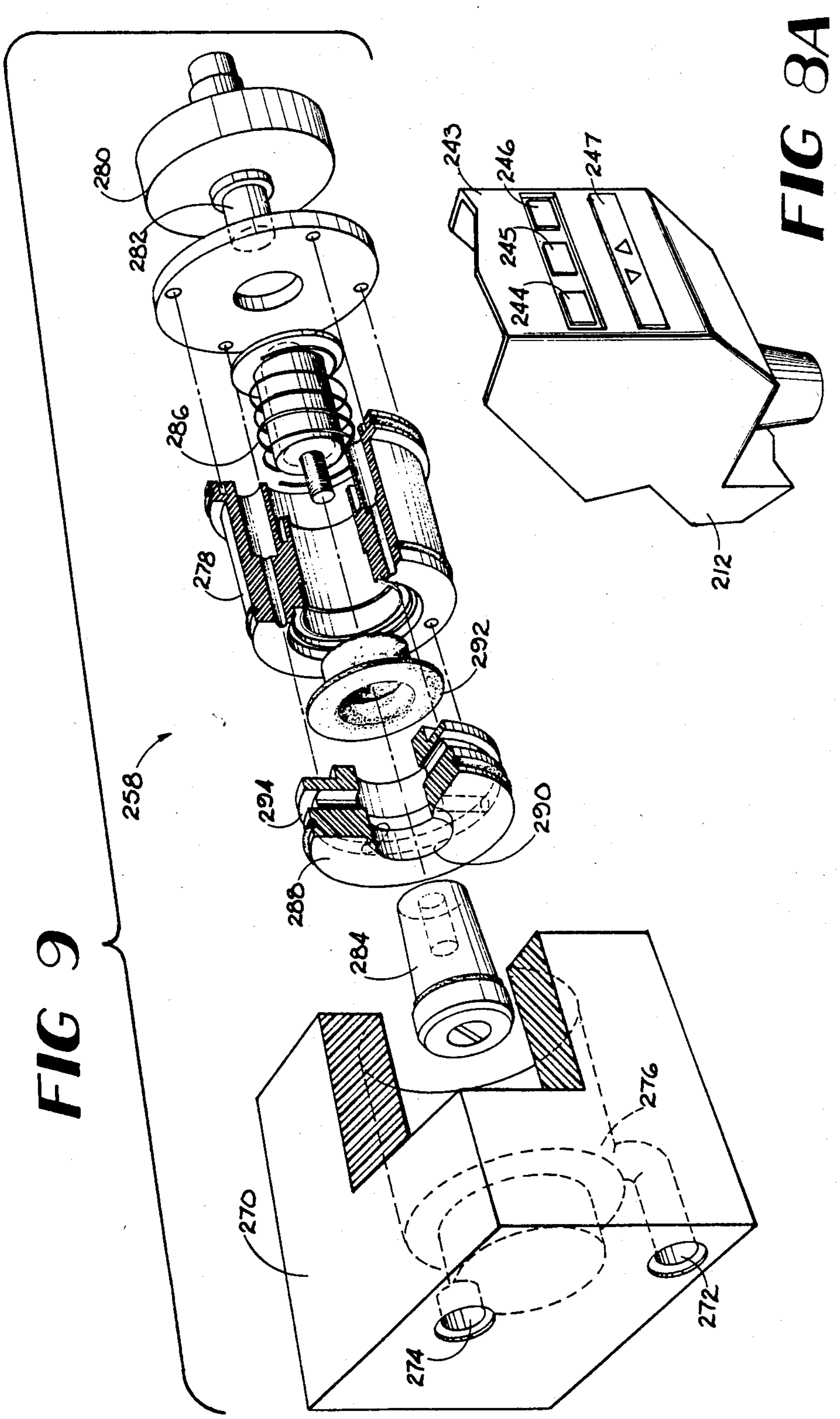
FIG. 8A is a partial front perspective view of the selector panel of the dispenser of FIG. 8.
FIG. 9 is an exploded perspective view of the water flow control valve of the present invention that is used in the dispenser of FIG. 8.
Figure 10:
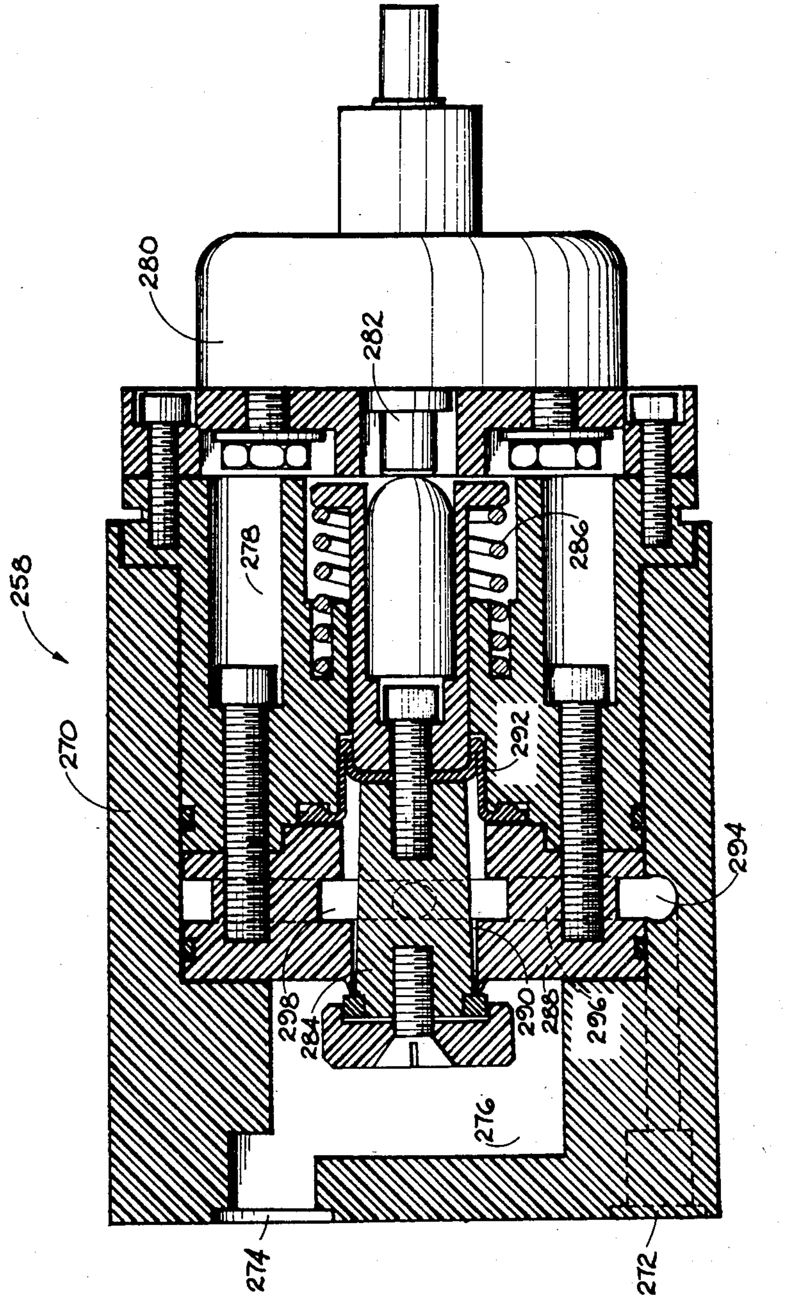
FIG. 10 is a cross-sectional side view of the flow control valve of FIG. 9 in its closed position.
Figure 11:
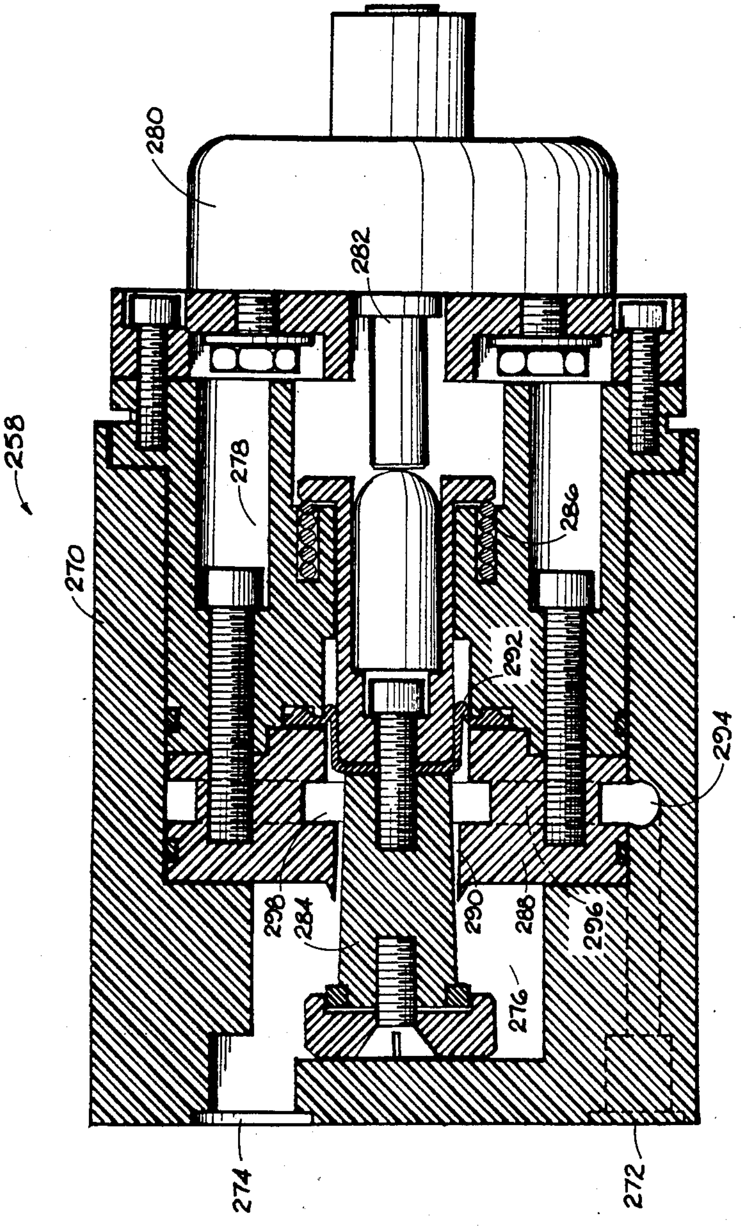
FIG. 11 is a view identical to FIG. 10 but showing the valve open.
Figure 12:
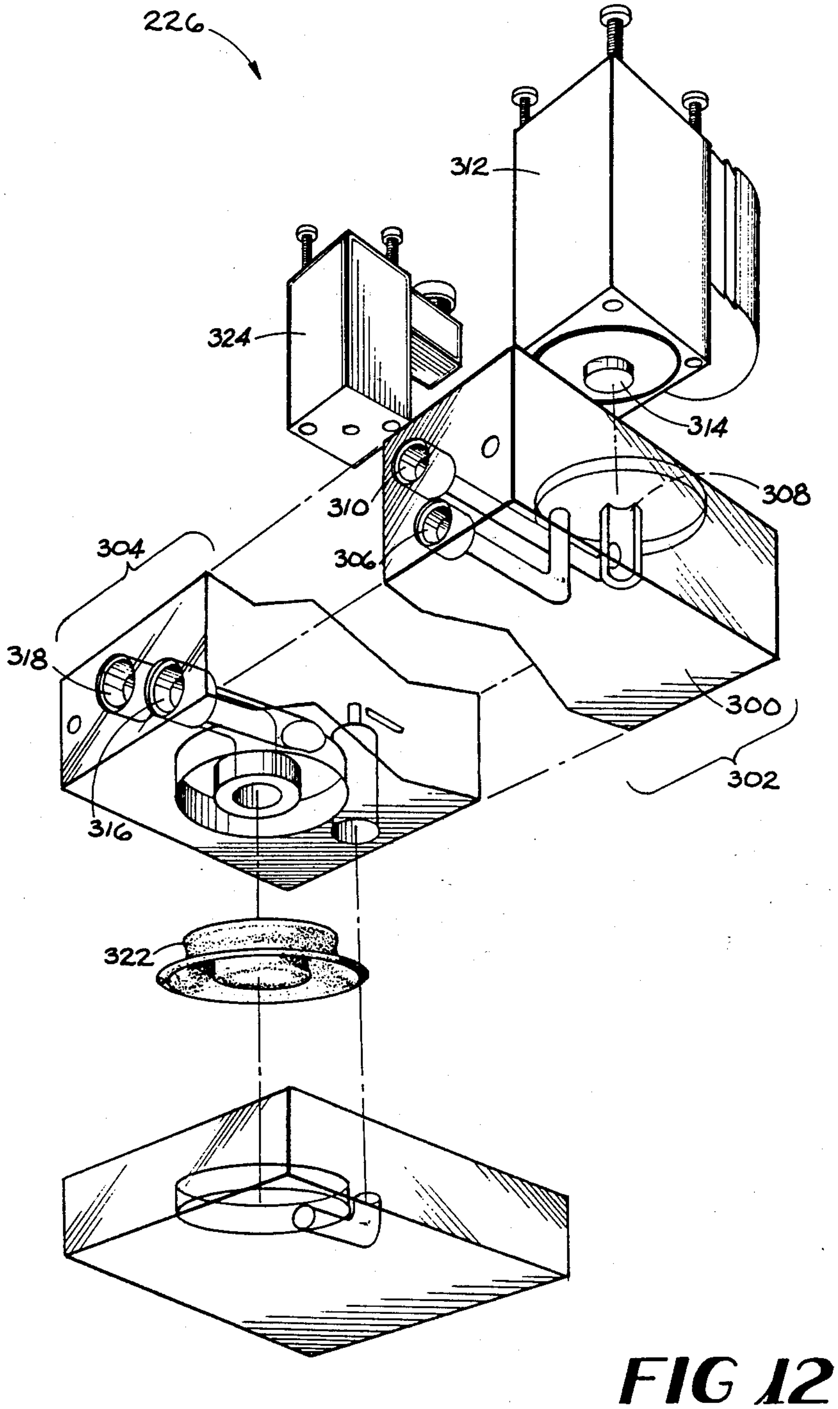
FIG. 12 is a partly broken away, exploded, perspective view of the shut-off valve used in the dispenser of FIG. 8.
Figure 13:
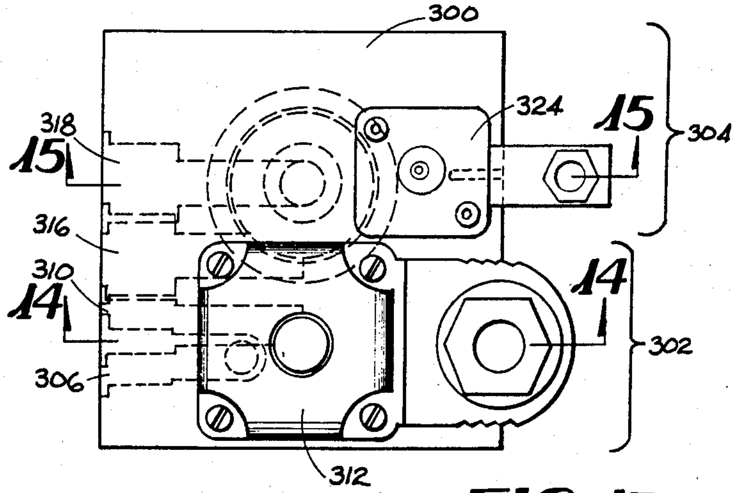
FIG. 13 is a top plan view of the shut-off valve of FIG. 12.

With reference now to the drawings, the flow control valve of the present invention is shown in FIGS. 9–11, and will be described below in reference thereto. FIG. 1 shows a postmix juice dispensing system 10 for dispensing a finished juice beverage from a nozzle 12 of a mixing chamber 16 into a cup 14. The system 10 feeds water and juice concentrate, in a desired ratio, for example, 5 parts of water to 1 part of concentrate, into a mixing chamber 16 wherein complete mixing of the concentrate and water takes place.

The water is fed through a water conduit 18 to a metering device 20 and then to the mixing chamber 16.

The concentrate is contained in a concentrate bag 30 at freezer temperatures of about −10° F. to about 0° F. The bag 30 is preferably a nonreturnable, flexible bag. The bag 30 is removed from a freezer and placed in a rigid, pressurizable canister 32 which is then pressurized by a pressure source (such as a $CO_2$ or compressed air cylinder 34) and a pressure regulator 36. The pressure forces the concentrate, which is not frozen (it has not undergone a phase change) because of its low water content but which is pliable, through a concentrate conduit 38 to a heat exchanger 40, then to the metering device 20, and then to the mixing chamber 16.

Figure 4:
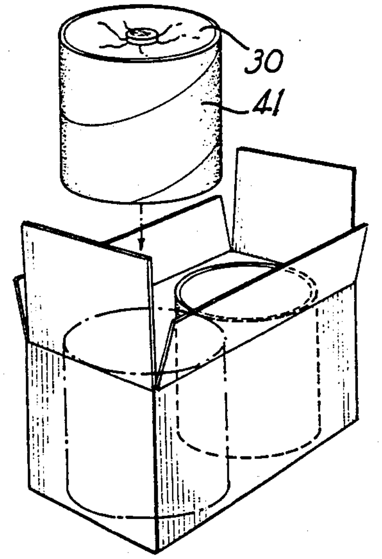
FIG. 4 is a perspective view of an orange juice concentrate container for use in shipping and storing orange juice concentrate at freezer temperatures.

This design allows dispensing of a 5+1 concentrate at freezer temperatures. The pliable concentrate is preferably contained in a flexible bag 30, shipped in a cylindrical container 41 (see FIG. 4) to facilitate insertion of the bag 30 into the cylindrical canister 32. The restaurant simply inserts the frozen bag 30 directly from the freezer into the canister 32, without requiring any thawing.

Figure 5:
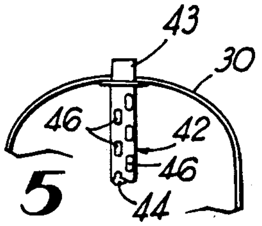
FIG. 5 is a partial, cross-sectional view through a concentrate bag, spout and dip tube.

FIG. 5 is a partial view of the bag 30 showing a dip tube or strip 42 connected to a spout 43. The dip strip 42 includes a central passageway 44 and a plurality of openings 46 into the passageway 44. The openings 46 are of a size sufficiently large to allow pulp to pass into the passageway 44 while preventing the bag from entering into and blocking the passageway 44. The larger cross-sectional area of the passageway 44 facilitates flowing of the concentrate and reduces pressure drops due to friction.

Figure 6:
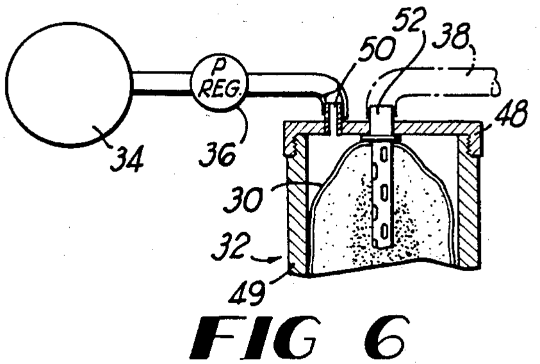
FIG. 6 is a partial, cross-sectional view through the top of a pressurizable canister or vessel for holding the flexible concentrate bag.

The canister 32 is shown in more detail in FIG. 6 and includes a removable lid 48 that hermetically seals to the wall 49 of the canister. The lid 48 includes a fitting 50 for pressurizing the canister 32 (with $CO_2$ or air, for example) and a concentrate fitting 52 for connecting the spout 43 of the bag 30 to the concentrate conduit 38.

As stated above, the concentrate in the bag 30 is preferably 5+1 concentrate. The canister is preferably pressurized to about 40 psig. This pressure forces the concentrate out of the bag to the heat exchanger 40 and then to the metering device 20 and finally to the mixing chamber 16.

The heat exchanger 40 includes a heat source 60 and can be any known type of heat exchanger and heat source. The heat exchanger preferably elevates the temperature of the concentrate to about 32° F. to 40° F. The heat source 60 can be a thermostatically controlled electrical heating element.

The metering device 20 (which can be any known type of metering device) provides the proper portioning of the water and orange juice concentrate. The device 20 can use two connected double-acting pistons in a volumetric piston pump for each of the water and concentrate conduits. The ratio of the volume of the water chambers to the concentrate chambers is the same as the desired mixture ratio, such as, for example 5:1 (water to concentrate). The water pistons can be connected to the concentrate pistons so that the pressurized water can be used to operate both pumps.

The system of FIG. 1 also includes a solenoid on-off valve 19 in the water line, operated by a microcontroller 64. When it is desired to dispense a drink, for example, when a cup 14 engages a lever 15, the microcontroller 64 causes the valve 19 to open, and when dispensing is completed, it closes the valve 19.

In addition, the microcontroller 64 also operates the inlet and outlet valves for the water and concentrate to and from the metering device 20, in response, for example, to sensed positions of the pistons. Volumetric piston pumps are well-known and thus need not be described in detail here.

Figure 2:
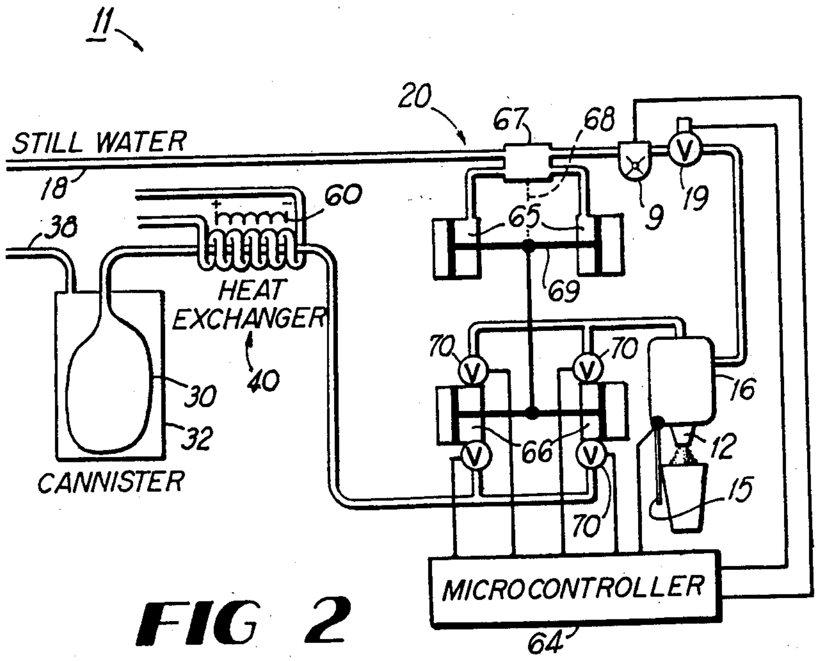
FIG. 2 is a partly diagrammatic, partly schematic illustration of another embodiment of a postmix juice dispensing system.

FIG. 2 shows a preferred embodiment of tee system of FIG. 1 in which a recirculating water conduit 59 is in heat exchange relationships to the concentrate conduit 38, in addition to the use of separate heat source 60. The water conduit 59 can be a recirculating soda water line available in the restaurant, for example. The heat source 60 prevents the water from freezing.

In addition, FIG. 2 shows a particular metering device 20 which can be used. FIG. 2 shows a water pump 65 with two connected pistons, connected in turn to two connected pistons of a concentrate pump 66. A water control valve 67 of the water pump is mechanically operated by a linkage 68 connected to a reciprocating shaft 69 connecting to the two water pistons. Inlet and outlet valves 70 of the concentrate pump 66 are preferably controlled by the microcontroller 64 in response to sensed positions of the concentrate pistons. In FIG. 1, the sensing of the positions of the pistons is shown at 62, and the control of the inlet and outlet valves at 61.

Figure 3:
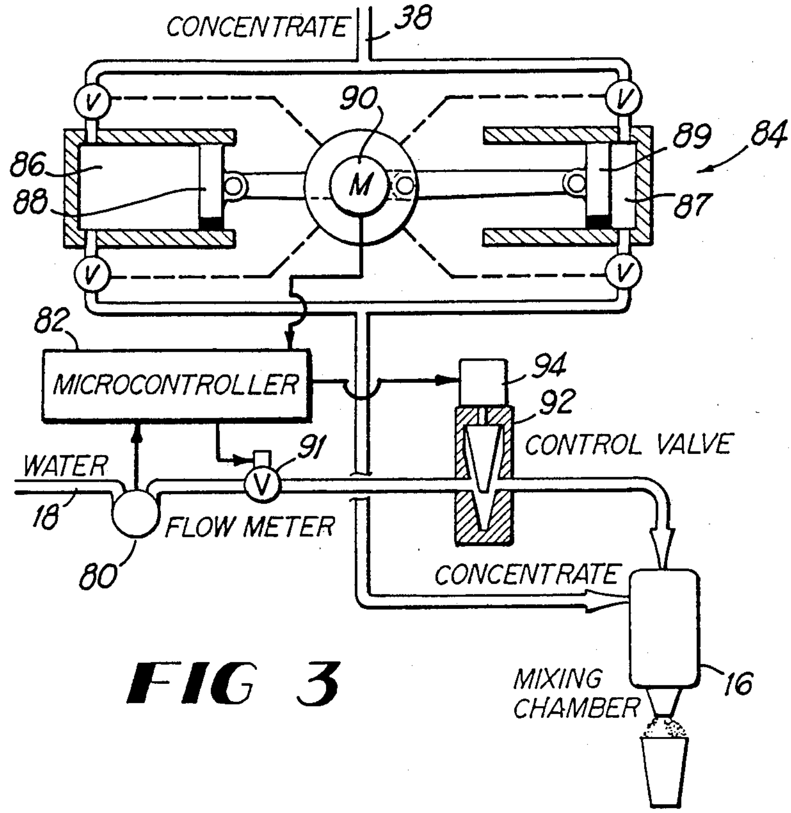
FIG. 3 is a partly cross-sectional, partly diagrammatic, partly schematic illustration of a metering system for use in the system of the present invention.

FIG. 3 shows an alternative means for metering the water and the orange juice concentrate. This means includes a flow meter 80 in the water conduit 18 for measuring the water flow rate; electrical pulses whose period is proportional to the water flow rate are inputted into a microcontroller 82. A volumetric pump 84 meters the concentrate through the concentrate conduit 38. The concentrate pump 84 incorporates two chambers 86 and 87 with connected pistons 88 and 89. Each piston stroke finds one piston expelling a fixed volume of concentrate while the attached chamber is filling with concentrate. A motor 90 moves the pistons 88 and 89. The motor speed can be fixed. The water flow rate is controlled by means of a variable size orifice in a motorized control valve 92 operated by a DC stepping motor 94. The microcontroller 82 controls the motor 94 to regulate the water flow rate.

Alternatively, the motor 90 can be adjustable with the microcontroller 82 regulating the speed of the motor 90 to control the concentrate flow rate depending on the water flow rate as measured by the flow meter 80, to control the mixture ratio. The microcontroller 82 can also control both the motor 90 and the control valve 92.

Figure 7:
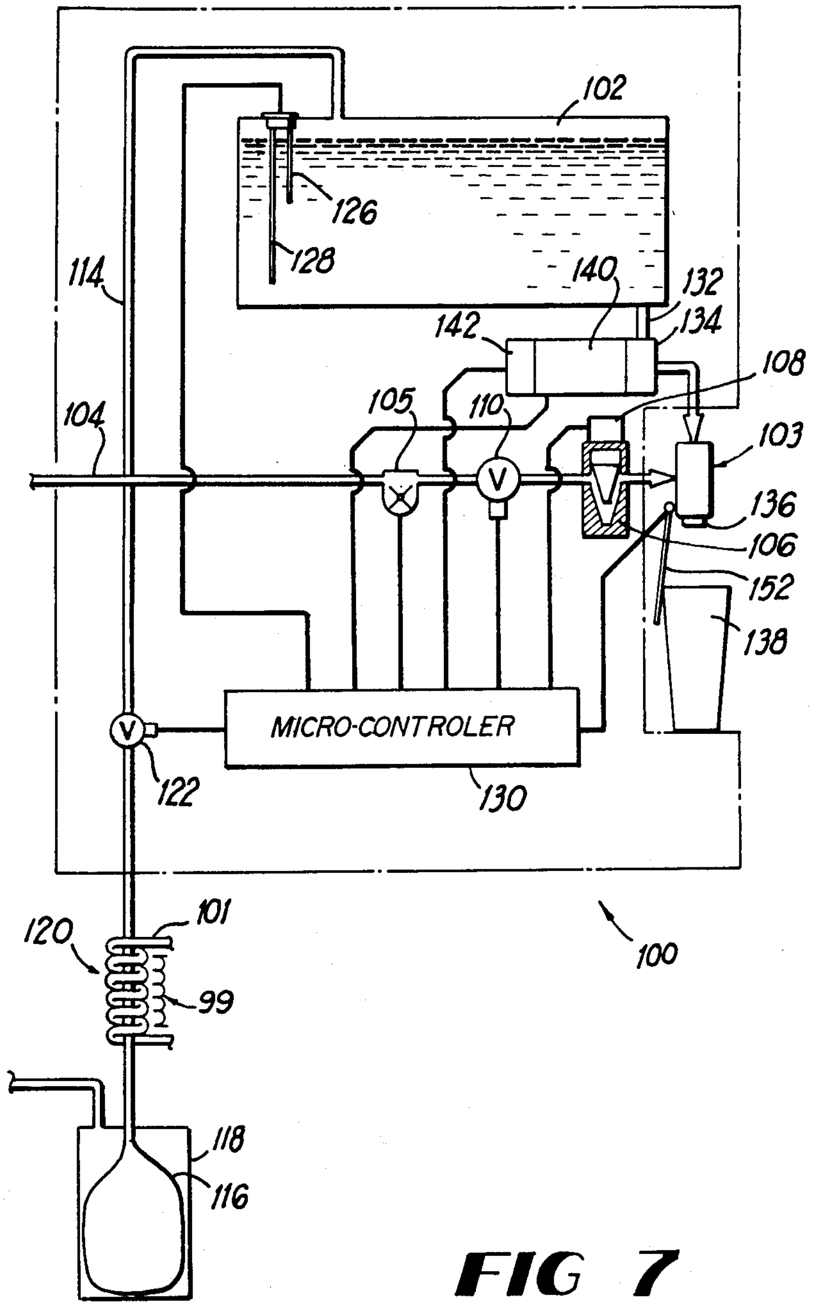
FIG. 7 is a partly diagrammatic, partly schematic illustration of another embodiment of a postmix juice dispensing system according to the present invention.

FIG. 7 shows another embodiment of the present invention of a dispensing system 100 in which the concentrate is fed to a vented reservoir 102. FIG. 7 shows a water conduit 104 connected to a mixing chamber 103 and having a water flow meter 105, a motorized control valve 106 operated by a D.C. stepping motor 108, and a solenoid controlled on-off valve 110.

FIG. 7 also shows a concentrate conduit 114 which feeds pliable concentrate from a flexible container 116 in a pressurized canister 118, through a heat exchanger 120 (including a heat source 99 and a recirculating soda water line 101), through a solenoid controlled on-off valve 122, to the reservoir 102. The reservoir 102 includes high and low level indicators 126 and 128, respectively, connected to a microcontroller 130, which opens and closes the on-off valve 122 in response to signals from the level indicators. A concentrate conduit 132 extends from the reservoir 102 to a flexible vane pump 134 (or a gerotor pump, for example), and then to the mixing chamber 103 where it mixes with the water to form a final beverage which is dispensed from a nozzle 136 into a cup 138.

In addition to the microcontroller 130 controlling the level of concentrate in the reservoir 102, it also controls the speed of a D.C. motor 140 with encoder 142 to control the concentrate flow rate, and it controls the water flow rate by controlling the motorized water control valve 106 in response to signals from the water flow meter 105. The microcontroller 130 also controls a solenoid controlled, water on-off valve 110 in response to actuation of the dispensing system 100, such as by the cup 138 engaging a lever arm 152.

Figure 8:
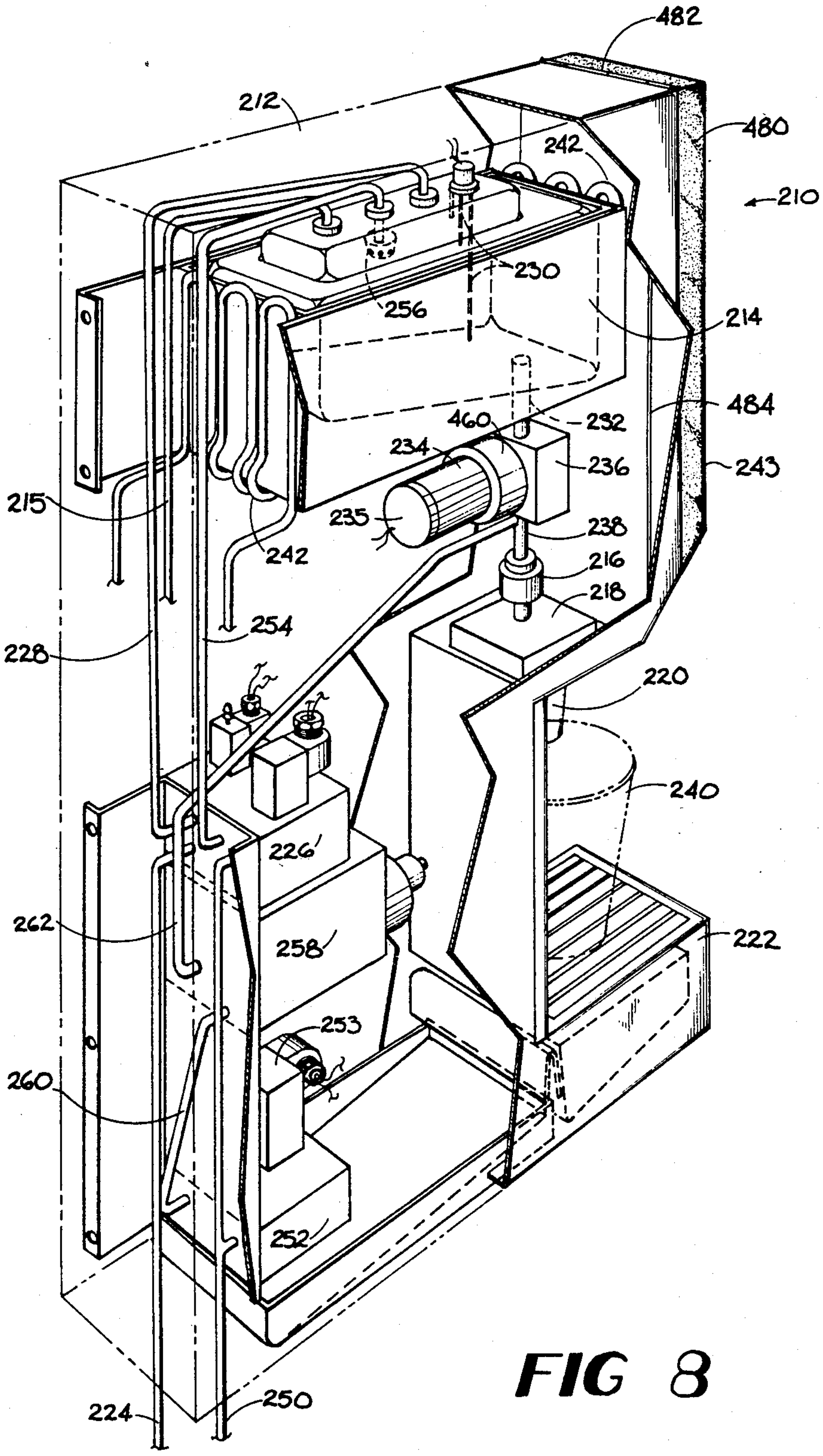
FIG. 8 is a partly broken away top, left rear perspective view of the preferred dispenser of the present invention.

With reference now to FIGS. 8–22 of the drawings, FIG. 8 shows the preferred juice dispenser 210 of the present invention including a narrow countertop housing 212, a water feed system, a juice concentrate feed system, a juice concentrate reservoir 214, a static mixer 216, a magnetic mixer 218, a nozzle 220, and a drip tray 222 for supporting a cup 240. The width of the housing 212 is preferably 3¾ inches, although it can vary from about 3¼ inches to about 5 inches. FIG. 8A is a partial front view of the selection panel 243 of the dispenser 210 including small, medium, large, and pour/cancel buttons 244, 245, 246 and 247 respectively.

Figure 17:
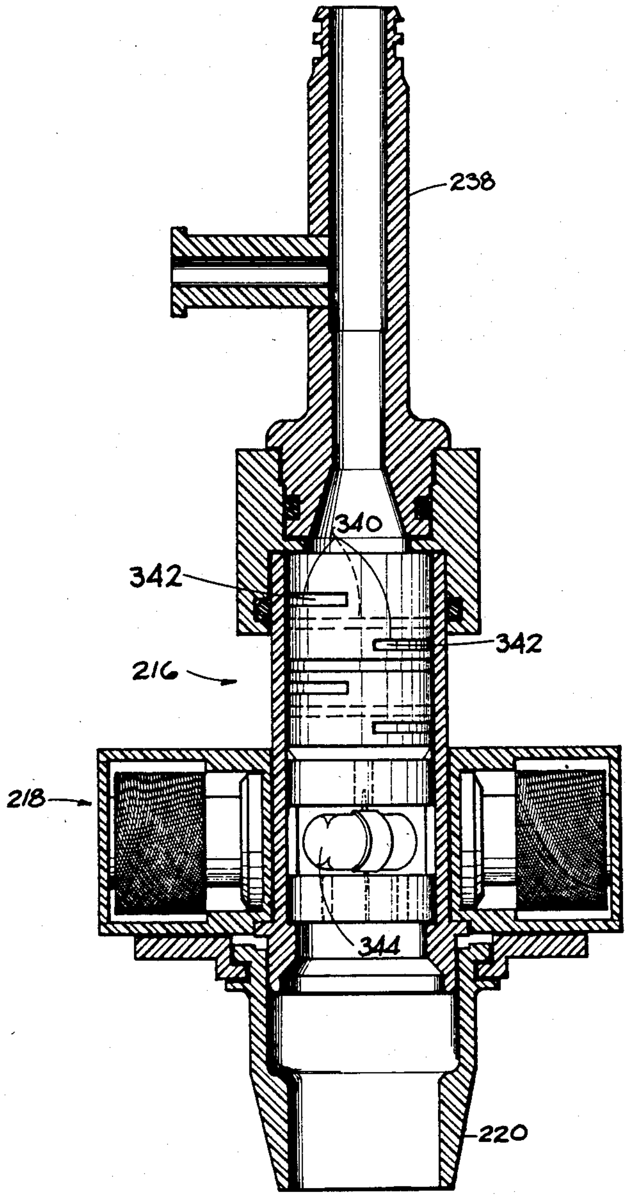
FIG. 17 is a cross-sectional side view through the components shown in FIG. 16.
Figure 18:
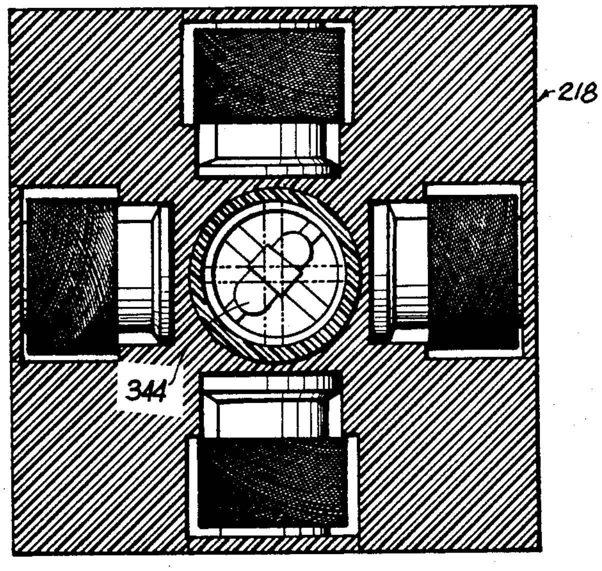
FIG. 18 is a cross-sectional top view taken along line 18—18 of FIG. 17.
Figure 19:
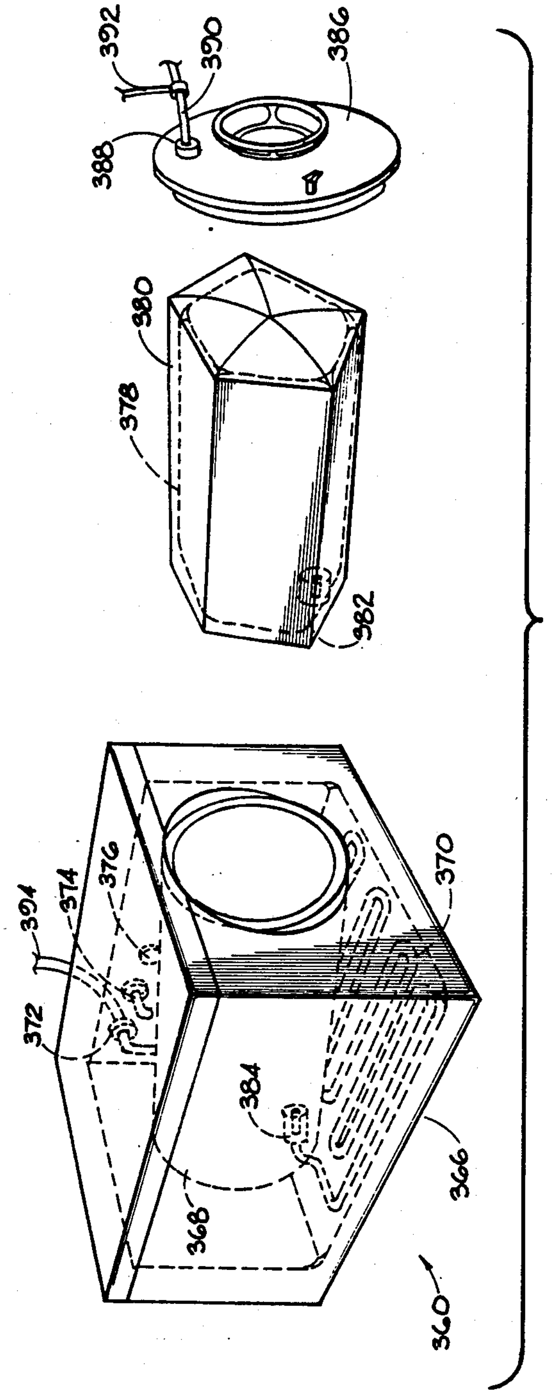
FIG. 19 is a partly broken away perspective view of the under-the-counter canister cabinet for the dispenser of FIG. 8.
Figure 20:
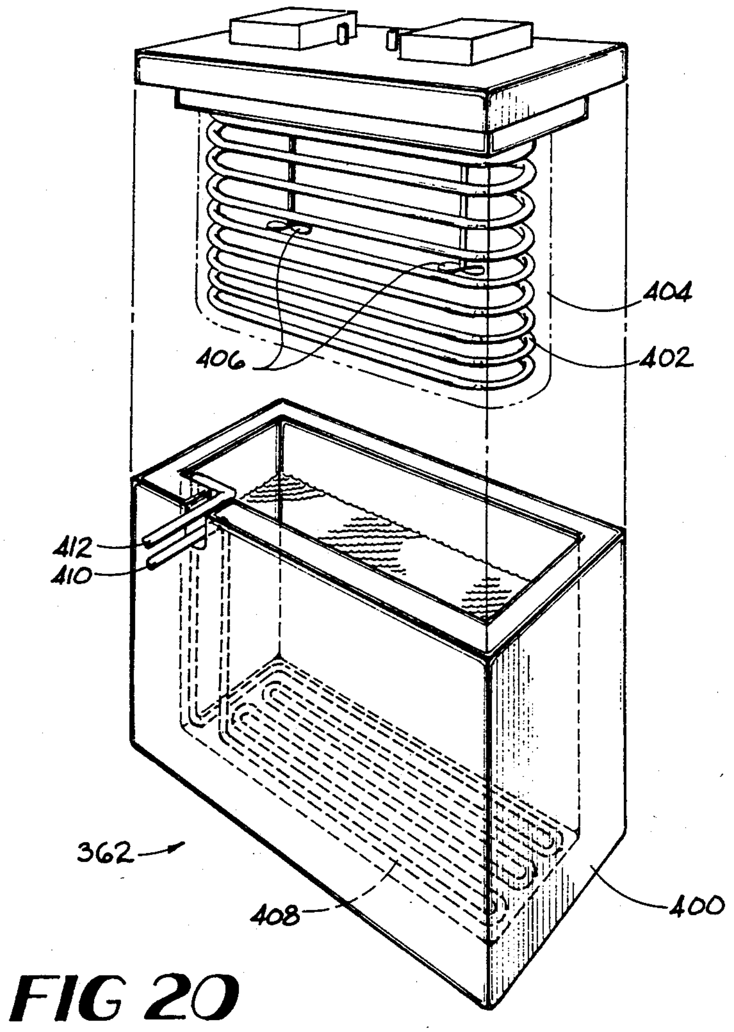
FIG. 20 is a partly broken away perspective view of the under-the-counter water bath for the dispenser of FIG. 8.
Figure 21:
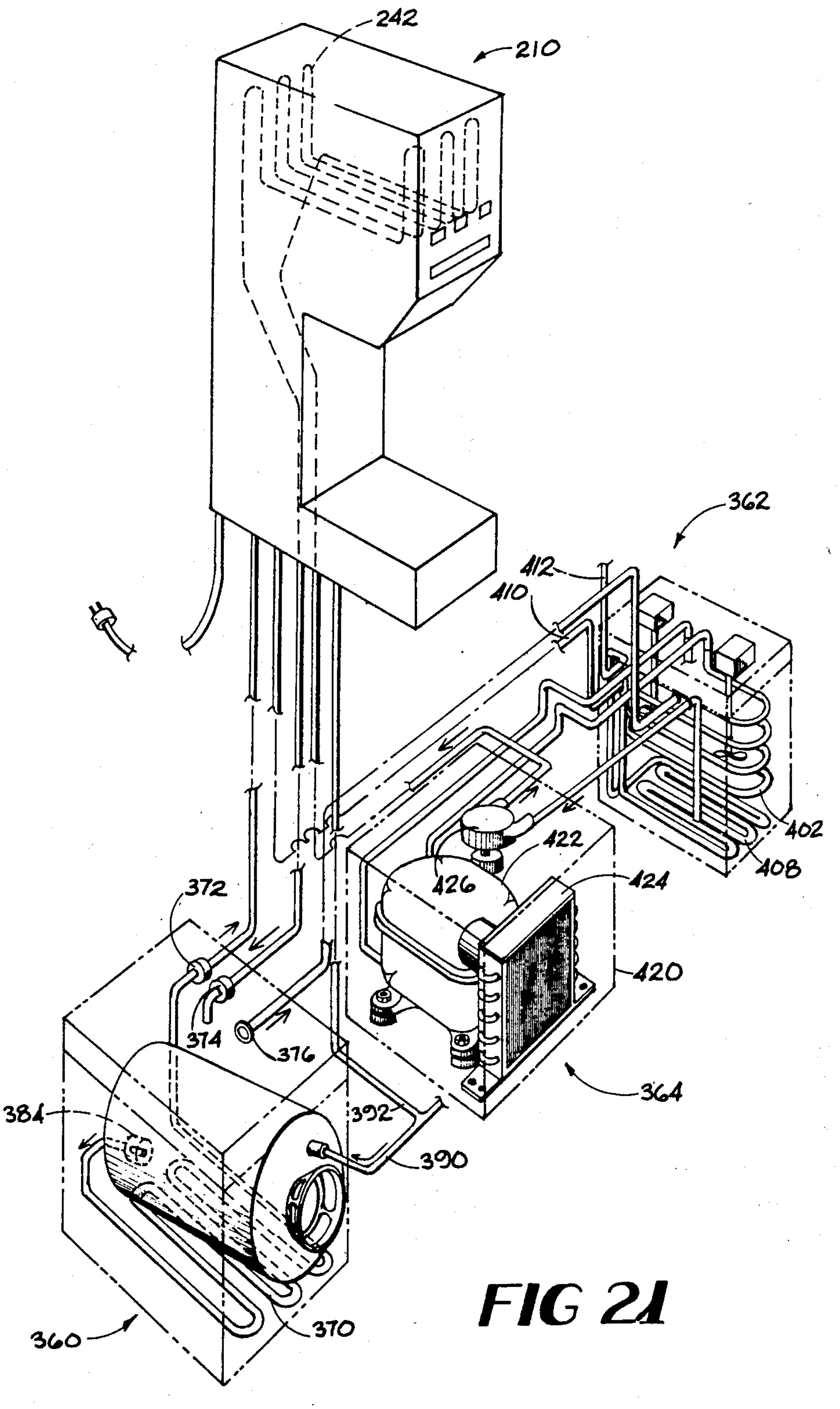
FIG. 21 is a partly broken away perspective view of the under-the-counter system for the dispenser of FIG. 8.
Figure 22:
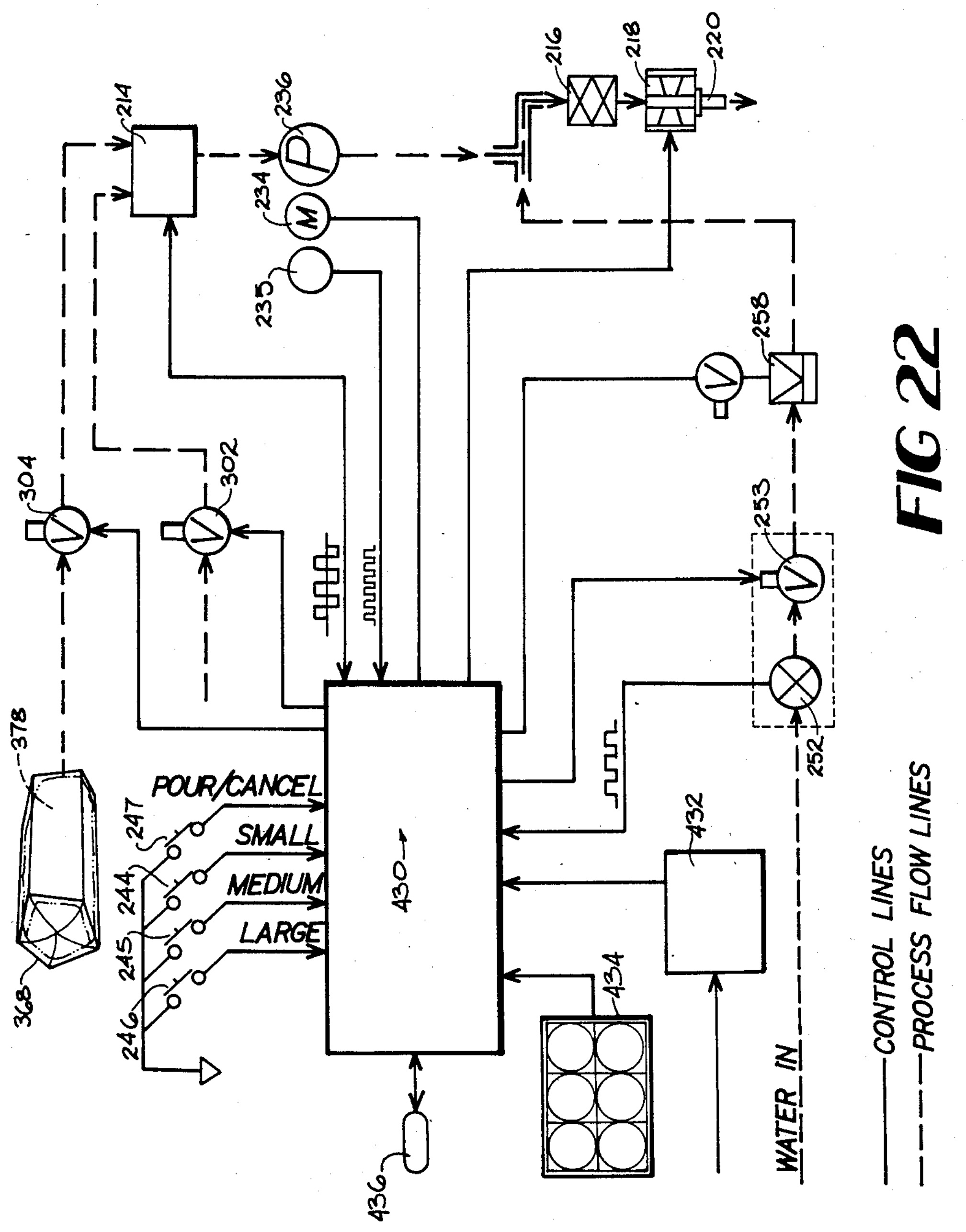
FIG. 22 is a partly diagrammatic, partly schematic view of the electronics used in the dispenser of FIG. 8.
Figure 23:
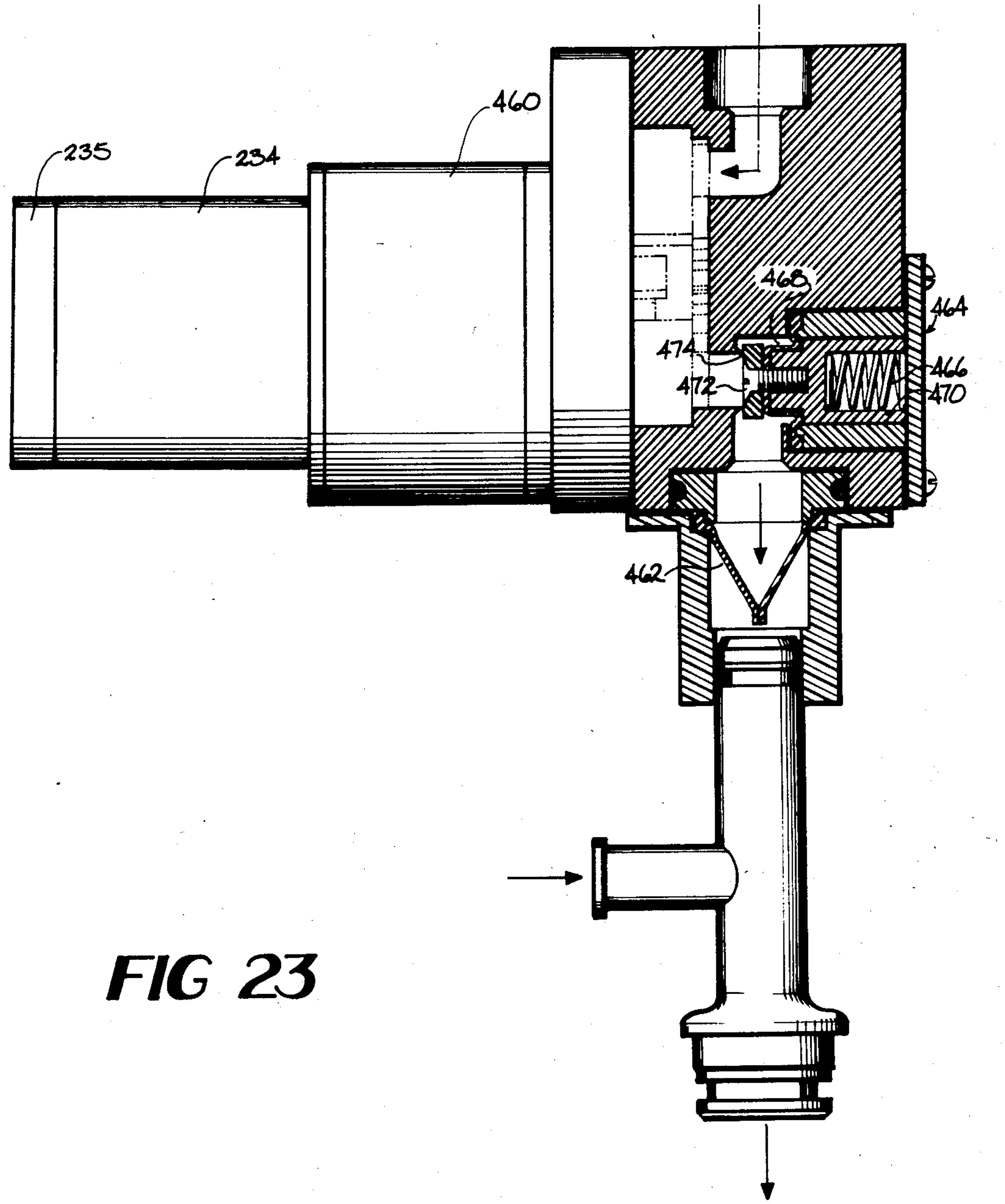
FIG. 23 is a partial side view through the pump, mixers, check valve and poppet valve of the dispenser of FIG. 8.

FIGS. 9–18 show the details of various components in the housing 212, FIGS. 19–21 show the details of the under-the-counter components, FIG. 22 is an electrical circuit diagram showing the electrical operation of the dispenser 210, and FIG. 23 shows details of the poppet valve and check valve used in the dispenser of FIG. 8.

Referring now to FIG. 8, the juice concentrate feed system includes a concentrate inlet conduit 224 that feeds into a shut-off valve 226, and a concentrate line 228 from the shut-off valve to the reservoir 214. A liquid level control system including three probes 230 (high level, low level and ground) controls the concentrate level in the reservoir 214. A vent line 215 vents the reservoir 214 to atmosphere. Concentrate is fed from the reservoir 214 through a discharge line 232 by means of a motor 234 and pump 236 to a mixing line 238 where it begins to mix with the water, then to the mixers 216 and 218 and finally to the nozzle 220 from which the mixture is dispensed into a cup 223.

The concentrate side of the shut-off valve 226 simply maintains a proper supply of concentrate in the reservoir. That is, when the level drops to a first predetermined lower level, the shut-off valve opens and feeds more concentrate to the reservoir until the level rises to a second predetermined higher level, when the shut-off valve again closes.

The concentrate in the reservoir is maintained at a desired chilled temperature by means of cooling coils 242 which are preferably in contact with the outside surface of the reservoir and which carry chilled water from a refrigeration system (not shown in FIG. 8).

The water feed system includes a water inlet conduit 250 that feeds to both a water flow meter 252 and to the shut-off valve 226. The water path to the shut-off valve 226 is used for cleaning and flushing the reservoir, while the water path to the flow meter 252 is the water to be mixed with the juice concentrate to produce the beverage.

Referring first to the flushing path, when it is desired to clean the reservoir, such as at the end of each day, the shut-off valve opens the water side and water flows through a water flush line 254 to a spray nozzle 256 to spray the entire insides of the reservoir. At the same time, the motor 234 turns on and drives the pump 236 to discharge the contents of the reservoir through the mixing line 238, the mixers 216 and 218, and the nozzle 220 cleaning this entire assembly of any juice concentrate.

Referring now to the potable water flow, the water flows into the flow meter 252, from the flow meter to a water shut-off solenoid valve 253, to a flow control valve 258 through a line 260, and from the flow control valve 258 through a discharge line 262 to connect to the mixing line 238 just upstream from the mixers 216 and 218 and the nozzle 220. Any suitable available flow meter can be used for the flow meter 252, such as a paddle wheel flow meter.

The flow control valve 258 is shown in detail in FIGS. 9–11, and includes a body 270 having an inlet 272, an outlet 274, a chamber 276, and a control element 278. The control element 278 includes a solenoid 280 having an armature 282 that, when energized, moves a valve 284 from its closed position (FIG. 10) to its open position (FIG. 11) against a spring 286. An annular plug 288 forms a wall across the chamber 276 and has a flow opening 290 therethrough in which the valve 284 moves. A diaphragm 292 provides a seal for the chamber 276. The inlet 272 communicates with an annular groove 294 around the plug 288 and through a plurality of radial passages 296 to the interior volume 298 adjacent the opening 290. When the solenoid 280 is energized, water can flow through the flow control valve 258.

The flow control valve 258 provides certain unique advantages including allowing the use of a small, less expensive, less powerful solenoid while providing large enough displacement of the poppet valve for use with pulse width modulation of the control valve.

The rolling diaphragm 292 is used to isolate the water from the solenoid 280, that is, if water leaked past the plunger 283 it could get into and damage the solenoid 280. The rolling diaphragm provides the necessary seal while doing so with much less friction than a standard O-ring would create. The small solenoid 280 would possibly not even be able to overcome the friction created by an O-ring seal. However, the rolling diaphragm creates the problem of increasing the hydraulic force on the needle valve, whereby a larger solenoid would be needed to overcome this larger force.

This problem is solved according to the present invention by balancing this additional hydraulic force caused by the rolling diaphragm (to reduce the overall net force on the needle valve) by tapering the needle valve in a direction that creates a hydraulic force on the needle valve in a direction opposite to that caused by the rolling diaphragm.

The needle valve 284 is tapered from a smaller to a larger diameter in the opening 290. Normally a tapered needle valve is tapered from a larger to a smaller diameter, however, such an arrangement would require a larger spring 286, and the solenoid would then have to be larger to overcome such larger spring force. By the present invention, the hydraulic (water) forces are balanced so that only a small force is required to be overcome by the solenoid 280.

The flow meter 252 can be any known flow meter to provide an electrical signal corresponding to the volume of water flowing therethrough.

Figure 14:
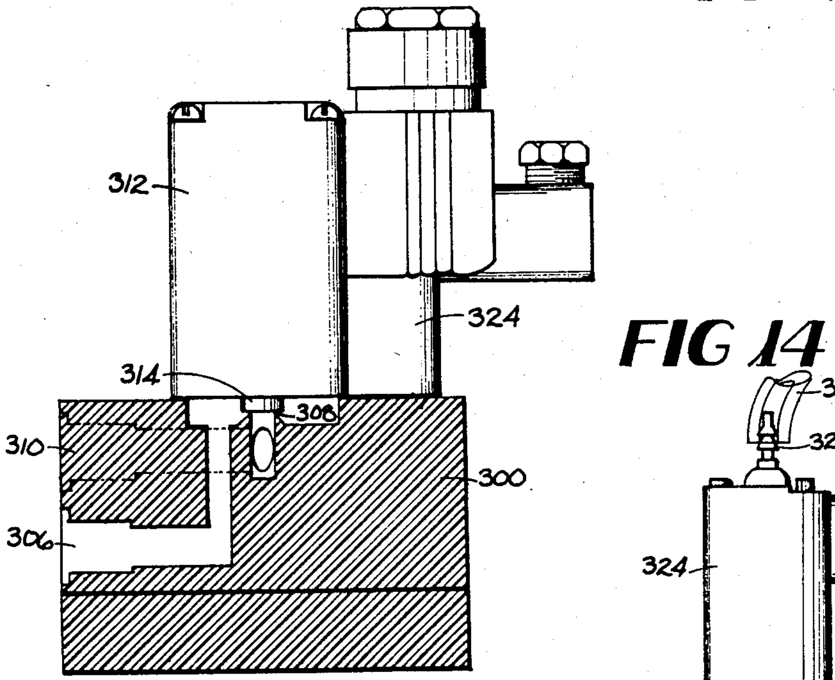
FIG. 14 is a partly cross-sectional side view through the water side of the valve of FIG. 12 taken along line 14—14 of FIG. 12.
Figure 15:
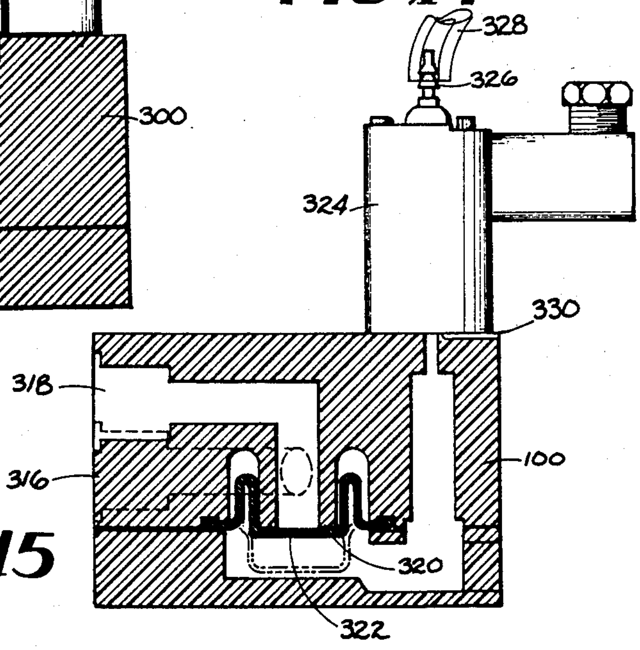
FIG. 15 is a partly cross-sectional side view through the concentrate side of the valve of FIG. 12 taken along line 15—15 of FIG. 12.

The shut-off valve 226 is shown in detail in FIGS. 12–15 and includes a body 300 and has a water side 302 and a concentrate side 304. The water side includes an inlet passageway 306, a valve seat 308, an outlet passageway 310, a solenoid 312, and an armature valve 314. FIG. 14 shows the water side closed; when the solenoid 312 is energized, the valve 314 moves up off the valve seat and opens the water line.

The concentrate side of the shut-off valve 226 includes a concentrate inlet passage 316, a concentrate outlet passage 318, a valve seat 320, a diaphragm 322 for opening and closing the concentrate line by moving against or away from the valve seat 320, and a solenoid 324 having a fitting 326 for a pressurized air line and having a vent hole 330. When the solenoid is de-energized, pressurized air pushes against the diaphragm 322 holding it closed. Upon energization the solenoid closes off the air line and vents the air pressure chamber 332 below the diaphragm to atmosphere, allowing the concentrate pressure to move the diaphragm down and open the passage so concentrate can now flow through the shut-off valve 226.

Figure 16:
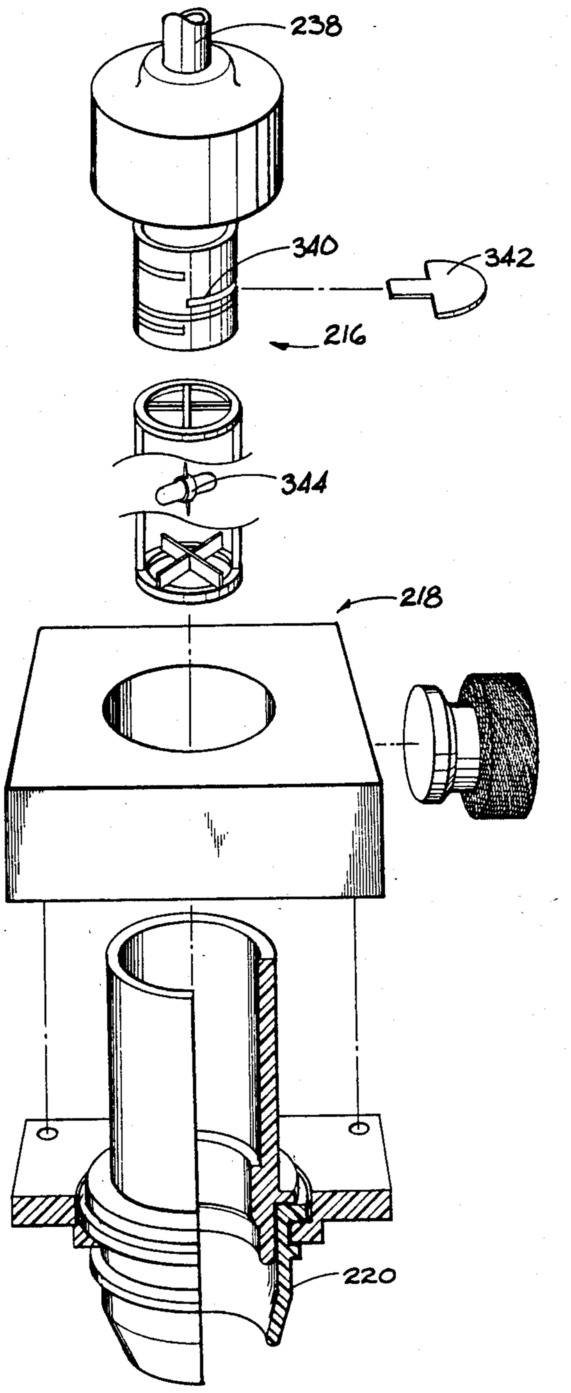
FIG. 16 is a partly cross-sectional, exploded view of the mixing devices and spout of the dispenser of FIG. 8.

The static and magnetic mixers are shown in FIGS. 16–18. The static mixer 216 includes a plurality of circumferentially staggered slots in each of which an insert 342 is placed to partially block the flow. Thus, the water and concentrate must follow a zig-zag, circuitous path which greatly aids thorough mixing.

The magnetic mixer 218 includes a series of magnets surrounding the mixing line 238. Inside the line 238 is a magnetic rotor 344 rotably mounted between two stationary rings 346 and 348 each having four blades; the blades in the second ring are positioned at 45° to the blades in the first ring. This combination of mixers assures complete and thorough mixing.

The nozzle 220 is located directly below the magnetic mixer 218.

All of the equipment described above goes on a countertop. The portion of the juice dispenser 210 that goes below a counter will now be described with reference to FIGS. 19–21. In the preferred embodiment, the under-the-counter equipment comprises three separate modules: a canister cabinet 360, a water bath 362 and a refrigeration unit 364.

Referring to FIG. 19, the canister cabinet 360 includes a housing 366, a pressurizable canister 368, a heat exchange coil 370, a concentrate outlet fitting 372, a cooling water-in fitting 374, and an overflow opening 376. A collapsible bag 378 of juice preferably 5+1 juice at freezer temperature (about 37° F.) is shipped in a cardboard box 380, preferably hexagonal in shape. The bag 378 has a bag fitting 382 that mates with a canister fitting 384 when the bag and box are inserted into the canister 368. The canister 368 includes a removable lid 386 that seals to the canister 368. The lid includes a pressurized air hose connector 388 for an air hose 390. The hose includes a T-fitting for a hose 392 that connects to the fitting 326 on the shut-off valve 226 in the dispenser 210.

In operation, the lid 386 is unlocked and removed, a box 380 and bag 378 are inserted into the canister and the lid is replaced and locked and sealed. The inside of the canister is pressurized by air to a desired pressure of about 45 psig. The 5+1 concentrate can thus be pushed out through the coil 370 where it is heated to about 40° F. and flows more freely. The concentrate flows through a concentrate line 394 to the dispenser 210. The housing 366 receives water from the cooling coils 242 that surround the concentrate reservoir 214 in the dispenser 210.

Referring to FIG. 20, the water bath includes a tank 400, evaporator coil 402 for forming an ice bank 404, a pair of agitators 406, and a series of potable water coils 408 on the tank bottom having an inlet fitting 410 and an outlet fitting 412. The water line carrying the water to be used in the dispenser 210 is connected to the inlet fitting 410. The water inlet conduit 250 (FIG. 8) is connected to the outlet fitting 412.

Referring to FIG. 21, the refrigeration unit 364 includes a housing 420, a compressor 422, a condenser coil 424, and a pump 426. The evaporator coil 402 in the water bath is part of and is connected to the refrigeration unit 364. The refrigeration unit simply holds the refrigeration equipment, plus the pump 426.

FIG. 22 is an electric circuit diagram showing the electrical operation of the dispenser 210.

The dispenser, 210 of FIG. 8 has been designed with flexibility as a primary goal. The dispenser 210 is capable of accurately dispensing various juices at ratios in the range of from about 2.5:1 to 7.5:1 and at rates to 3 ounces per second. Many smart features are incorporated into the electronics to improve functionality including the 'Teach' function which allows the machine to interactively learn various portion sizes; these sizes are then stored in non-volatile random access memory and used for automatic portion dispensing.

Component Description:

Following are the major electro-mechanical system components:

- Concentrate solenoid valve 324.
- Concentrate level probes 230.
- Concentrate pump motor 236 with high resolution encoder 235.
- Flush solenoid valve 312.
- Water flowmeter 252.
- Water shut-off solenoid valve 253.
- Water modulating solenoid valve 280.
- Dynamic juice mixer 218.

Following are the major electronic system components:

- Dual voltage remote DC power supply 432.
- Bi-Directional RS-232C serial communications port.
- Primary and secondary functions operator keypads 243 and 434.
- Electronics 430 including a printed circuit board consisting of:
  - an Intel 8052 series 8-bit microcontroller
  - an Intel 8254 counter/timer IC
  - non-volatile, static random access memory (SRAM).
  - erasable, programmable, read only memory (EPROM) for program storage
  - a watch-dog circuit to reset the processor
  - RS-232C transmitter and receiver opto-isolated from the processor
  - input signal conditioning circuitry for the level probes, the concentrate encoder and the water flowmeter
  - opto-isolated output driver circuitry for the concentrate pump motor, and the concentrate, flush, water modulating and shut-off solenoids.

General Control Philosophy:

There are two process control closed loops, the concentrate and water loops. Pump motor operation is initiated and concentrate flow rate is determined by monitoring the high resolution encoder and using this feedback to achieve the desired flow rate in a classic interactive closed loop control. Similarly the water shut-off and modulating solenoids initiate flow and the water flowmeter feeds back rate information in an interactive process that is used to achieve the desired flow rate. Upon initialization the processor reads the mixture ratio and water flowmeter calibration switches on the circuit board and knowing the programmed rate for each of the selected portion sizes performs a calculation to determine the number of water flowmeter counts per unit time that is necessary to achieve the desired flow rate. This number then becomes the target feedback that the water closed loop control is proportionately adjusted to achieve when the actual differs from the calculated. The concentrate encoder counts per unit time are calculated and utilized in much the same manner except that in the present configuration calibration switches, to correct for variations from one pump to the next, have not been incorporated.

Rates are controlled to continually achieve not only the correct mixture ratio but also to provide other beneficial features e.g., a slow ramp up at dispense initiation is necessary to reduce cup upsets then high speed dispensing proceeds to reduce dispense time and just prior to cycle termination the flow rate is ramped down to reduce foaming and spillage.

Monitoring the two process loops also helps the processor detect anomalies in one that can be compensated for in the other e.g., a low water flow rate caused by low line pressure or a partially plugged line results in a proportionate decrease in the concentrate flow rate to maintain the pre-set ratio and vice versa. The processor then flashes the dual function 'Low reservoir' LED (light emitting diode) at a steady rate to indicate the low flow condition.

The flow monitors by their very nature also provide information on the volume of fluids dispensed which is used by the 'Teach' feature to provide portion size dispensing. Depressing the 'Teach' key initiates this special mode, then a portion size key is pressed to indicate to the microprocessor that it will be "taught" the size of a 'Small', 'Medium' or 'Large' drink; the 'Pour/Cancel' key is pressed and held pressed which causes the machine to dispense product at the correct pre-set mixture ratio while the microprocessor is totalizing the quantity of each fluid dispensed. When the 'Pour/Cancel' key is released the microprocessor remembers the totalized quantities of concentrate and water dispensed and will reproduce those quantities whenever that portion size key is pressed again.

Inventory Control and Diagnostics:

Inventory management and diagnostic information is provided by the flow sensors and by the ability of the processor's firmware to monitor inputs and control outputs including:

- Number of each of the various portion sizes of drinks dispensed.
- Volume of each portion size.
- Total amount of concentrate used.
- Total amount of water used.
- Water to concentrate ratio.
- Size of last drink dispensed.
- Volume of concentrate in last drink.
- Volume of water in last drink.
- Total time to dispense last drink.
- Number of manual pours.

Volume dispensed via manual pours.
Water flow meter calibration.
Pump status.
Reservoir level status.
Flow rate status.
Status of solenoids.

The above information is saved on-board in non-volatile static random access memory and can be monitored asynchronously as desired through the serial port. The serial port can also be used to change default parameters in memory to fine-tune the process, if so desired.

The electronics 430 is preferably mounted in the dispenser 210 behind a front panel 480 that is hingedly connected at 482 to swing up and expose a circuit board 484 and make the panel holding the "Teach" button, for example, accessible.

FIG. 23 shows the pump 236 in more detail. The pump is preferably a gerotor pump driven by the motor 234 and including a gear box 460 and the encoder 235. It is preferred to flush the mixing line 238 and the mixers 216 and 218 once a day with potable water from the line 260. However, because the mixers 216 and 218 are restrictions in the line, the water pressure could cause this flushing water to back up through the pump 236 and dilute the concentrate in the reservoir 214. A duckbilled check valve 462 at the outlet of the pump 236 prevents this from occurring.

In addition, to prevent any concentrate from dripping from the pump 236, a spring loaded poppet valve 464 is located at the outlet from the pump and just upstream from the check valve 462. The poppet valve 464 includes a spring 466, a diaphragm 468, a piston 470, a poppet 472, and a valve seat 474. When the pump 236 is operating, the concentrate will flow easily through the poppet valve 464 and check valve 462, however, when the pump is not operating the poppet valve will close and prevent any drippage of concentrate out of the gerotor pump 236.

While the preferred embodiment of this invention has been described in detail, it is to be understood that variations and modifications can be made therein without departing from the spirit and scope of the present invention as set forth in the appended claims. For example, the flow control valve can be used with other liquids than water, such as syrups. The solenoid can be a pull solenoid in other geometries of the valve. The solenoid is preferably a proportional solenoid although this is not essential. The term "sealing ring" is used generically to cover either the hard seat or the elastomeric ring; that is, either one can be on the seat and the other on the needle valve. The valve preferably uses a spring but this is not essential, because the taper can be made to provide the desired net force on the needle valve.

I claim:

1. A method for controlling the flow of liquid through a solenoid valve with the smallest possible solenoid comprising:

(a) providing a valve body having a liquid passageway therethrough and including an inlet chamber and an outlet chamber with a flow control orifice therebetween including a valve seat;

(b) providing a solenoid operated needle valve movably positioned in said orifice between open and closed positions thereof for moving away from the inlet chamber and into the outlet chamber when said needle valve moves from its closed to its open position;

(c) reducing the friction of a seal between said needle valve and said valve body by providing a rolling diaphragm therebetween, said rolling diaphragm forming a wall of said inlet chamber; and (d) reducing the net liquid force on said needle valve by providing said needle valve with a taper from a smaller to a larger diameter in the direction from said inlet chamber to said outlet chamber such that the liquid force on said needle valve in said inlet chamber created by said taper is in the direction opposite to the liquid force on said needle valve created by said rolling diaphragm, so as to balance out such forces to a desired minimum.

2. The method as recited in claim 1 including spring biasing said needle valve toward its closed position with a spring located outside of said liquid passageway.

3. The method as recited in claim 2 including providing a proportional solenoid for said solenoid.

4. A liquid flow control solenoid comprising:

(a) a valve body having a liquid passageway therethrough and including an inlet chamber and an outlet chamber with a flow control orifice therebetween including a valve seat;

(b) a solenoid operated needle valve movably positioned in said orifice between open and closed positioned thereof for moving away from the inlet chamber and into the outlet chamber when said needle valve moves from its closed to its open position;

(c) a rolling diaphragm between said needle valve and said valve body, said rolling diaphragm forming a wall of said inlet chamber;

(d) said needle valve having a taper from a smaller to a larger diameter in the direction from said inlet chamber to said outlet chamber such that the liquid force on said needle valve created by said taper is in the opposite direction to the liquid force thereon created by said rolling diaphragm, so that such forces are balanced to a desired degree.

5. The apparatus as recited in claim 4 including a spring located outside of said liquid passageway and biasing said needle valve closed.

6. The apparatus as recited in claim 4 wherein said solenoid is a proportional solenoid.

7. A liquid flow control solenoid valve comprising:

(a) a valve body having a liquid passageway therethrough and including an inlet chamber and an outlet chamber with a flow control orifice therebetween including a valve seat;

(b) said needle valve movably positioned in said orifice between open and closed positions thereof for moving away from the inlet chamber and into the outlet chamber when said needle valve moves from its closed to its open position and including a sealing ring adapted to contact said seat, said needle valve tapering from a smaller diameter upstream of said seat to a larger diameter downstream of said seat;

(c) a biasing spring located outside of said liquid passageway for urging said needle valve to its closed position;

(d) a rolling diaphragm connected between said needle valve and said body for providing a seal therebetween, said rolling diaphragm forming a wall of said inlet chamber; and (e) a proportional push solenoid connected to said valve body and including a solenoid armature adapted to move said needle valve from its closed to an open position, the amount of opening depending on the length of travel of the needle valve, which in turn is dependent on the force applied by the solenoid, whereby the hydraulic forces on said needle valve are balanced to a degree such that a smaller solenoid can be used to more said needle valve.

8. A method for controlling the flow of liquid through a liquid flow control solenoid valve comprising:

(a) providing a valve body having a liquid passageway therethrough and including an inlet chamber and an outlet chamber with a flow control orifice therebetween including a valve seat;

(b) providing a needle valve movably positioned in said orifice between open and closed positions thereof and including a sealing ring adapted to contact said seat for moving away from the inlet chamber and into the outlet chamber when said needle valve moves from its closed to its open position;

(c) providing a biasing spring outside of said liquid passageway urging said needle valve to its closed position;

(d) providing a rolling diaphragm in said inlet chamber and connected between said needle valve and said body for providing a seal therebetween;

(e) providing a proportional push solenoid connected to said valve body and including a solenoid armature adapted to move said needle valve from its closed to an open position, the amount of opening depending on the length of travel of the needle valve, which in turn is dependent of the force supplied by the solenoid; and (f) balancing the hydraulic forces on said needle valve to a degree by providing said needle valve with a taper from a smaller diameter upstream from said seat to a larger diameter downstream from said seat whereby only a smaller net hydraulic force urges said needle valve to its closed position, so that a smaller solenoid can be used to move said needle valve.

* * * * *

UNITED STATES PATENT AND TRADEMARK OFFICE

CERTIFICATE OF CORRECTION

PATENT NO. : 4,889,148

DATED : December 26, 1989

INVENTOR(S) : Kenneth G. Smazik

It is certified that error appears in the above-identified patent and that said Letters Patent is hereby corrected as shown below:

Column 12, line 26, delete "positioned" and insert --positions-- therefor.

Column 13, line 6, delete "more" and insert --move-- therefor.

Column 14, line 12, delete "of" and insert --on-- therefor.

Signed and Sealed this

Twenty-eighth Day of January, 1992

*Attest:*

HARRY F. MANBECK, JR.

*Attesting Officer*

*Commissioner of Patents and Trademarks*